(12) United States Patent
Kumar

(10) Patent No.: US 10,378,566 B2
(45) Date of Patent: Aug. 13, 2019

(54) FLOW CONDITIONER

(71) Applicant: Endress+Hauser Flowtec AG, Reinach (CH)

(72) Inventor: Vivek Kumar, Allschwil (CH)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 15/562,646

(22) PCT Filed: Mar. 24, 2016

(86) PCT No.: PCT/EP2016/056537
§ 371 (c)(1),
(2) Date: Sep. 28, 2017

(87) PCT Pub. No.: WO2016/156196
PCT Pub. Date: Oct. 6, 2016

(65) Prior Publication Data
US 2018/0112690 A1    Apr. 26, 2018

(30) Foreign Application Priority Data

Apr. 1, 2015   (DE) .................. 10 2015 105 058

(51) Int. Cl.
*F15D 1/02*    (2006.01)
*F16L 55/027*    (2006.01)
*G01F 1/684*    (2006.01)

(52) U.S. Cl.
CPC ........ *F15D 1/025* (2013.01); *F16L 55/02718* (2013.01); *G01F 1/6842* (2013.01)

(58) Field of Classification Search
CPC ........................ F15D 1/025; F16L 55/02718
USPC ............................................. 138/39, 42, 44
See application file for complete search history.

(56) References Cited

U.S. PATENT DOCUMENTS

| | | | |
|---|---|---|---|
| 3,840,051 A * | 10/1974 | Akashi | F15D 1/025 138/37 |
| 5,495,872 A * | 3/1996 | Gallagher | F15D 1/025 138/40 |
| 5,529,093 A | 6/1996 | Gallagher et al. | |
| 5,596,152 A * | 1/1997 | Bergervoet | F15D 1/0005 138/44 |

(Continued)

FOREIGN PATENT DOCUMENTS

| | | |
|---|---|---|
| CN | 1670423 A | 9/2005 |
| CN | 1774616 A | 5/2006 |

(Continued)

OTHER PUBLICATIONS

Search Report for German Patent Application No. 10 2015 105 058.7, German Patent Office, dated Apr. 12, 2016, 7 pp.

*Primary Examiner* — James F Hook
(74) *Attorney, Agent, or Firm* — Mark A. Logan; PatServe

(57) ABSTRACT

A flow conditioner comprising a perforated plate with a central hole and four or more circular paths, which are arranged radially from the central hole and concentrically with one another, wherein holes are arranged on these concentric circular paths, characterized in that a preponderate number of holes of an intermediate circular path have a greater hole diameter than a preponderate number of holes of the innermost and a preponderate number of holes of the outermost circular paths.

13 Claims, 1 Drawing Sheet

(56) References Cited

U.S. PATENT DOCUMENTS

| | | | | |
|---|---|---|---|---|
| 6,145,544 A | * | 11/2000 | Dutertre | F15D 1/025 138/39 |
| 6,199,434 B1 | * | 3/2001 | Cornil | G01F 1/08 73/195 |
| 2005/0178455 A1 | * | 8/2005 | Cancade | F16L 55/027 138/39 |
| 2006/0096650 A1 | * | 5/2006 | Sawchuk | F15D 1/001 138/39 |
| 2016/0061372 A1 | * | 3/2016 | Sawchuk | F15D 1/025 138/39 |
| 2016/0097411 A1 | * | 4/2016 | Sawchuk | F16L 55/02709 138/39 |
| 2016/0334249 A1 | * | 11/2016 | Sawchuk | G01F 1/40 |

FOREIGN PATENT DOCUMENTS

| | | |
|---|---|---|
| CN | 100414167 C | 8/2008 |
| DE | 69903987 T2 | 7/2003 |
| DE | 102011079993 A1 | 1/2013 |
| EP | 1793102 A1 | 6/2007 |
| EP | 2068129 A1 | 6/2009 |

* cited by examiner

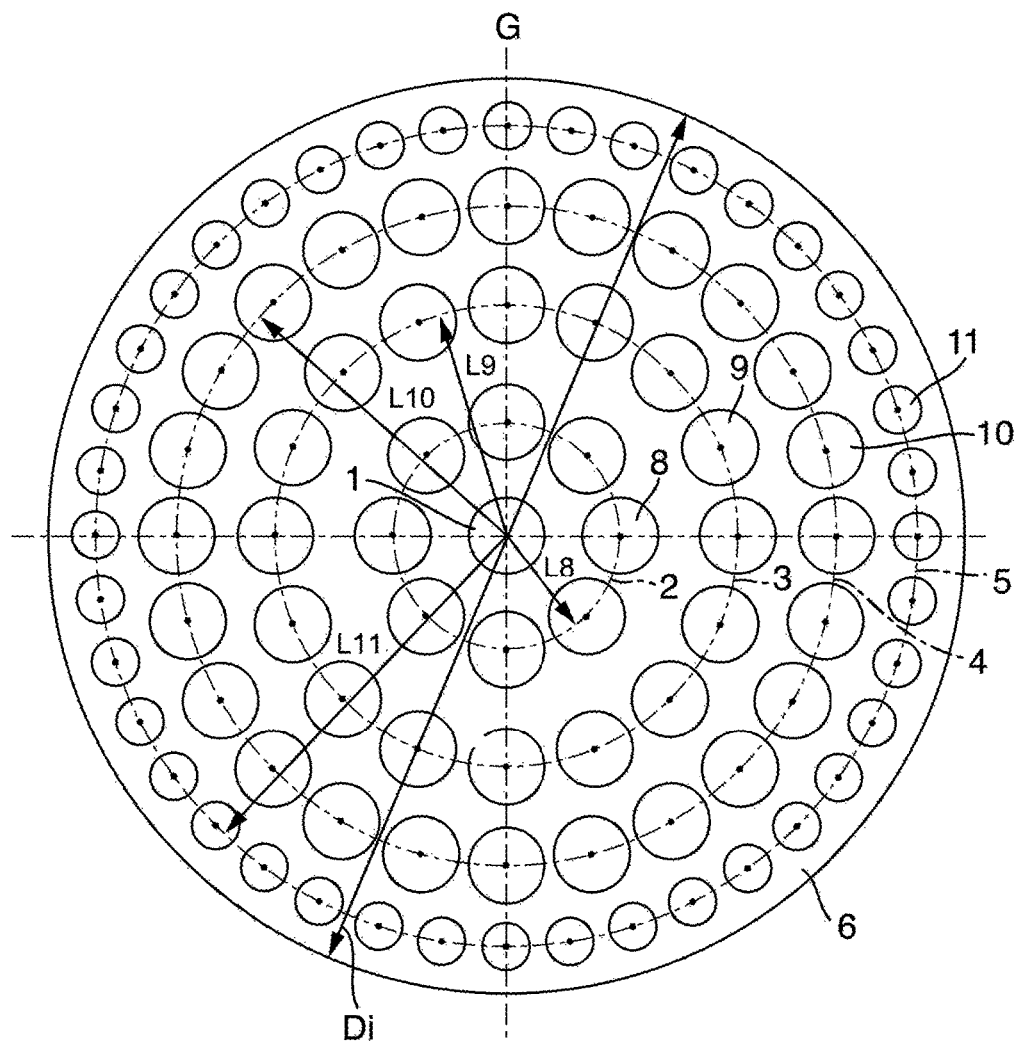

FLOW CONDITIONER

CROSS-REFERENCE TO RELATED APPLICATIONS

The present application is related to and claims the priority benefit of German Patent Application No. DE 10 2015 105 058.7, filed on Apr. 1, 2015 and International Patent Application No. PCT/EP2016/056537 filed on Mar. 24, 2016 the entire contents of which are incorporated herein by reference.

TECHNICAL FIELD

The present invention relates to a flow conditioner as defined in the preamble of claim 1.

BACKGROUND

Flow conditioners have been known for quite some time and serve to convert a flow into a flow with a known flow profile. Compare, for example, U.S. Pat. Nos. 3,840,051, 5,341,848, DE 10 2006 046 252 A1 and U.S. Pat. No. 5,529,093. Known forms of embodiment are also discussed in the paper, "A new concept of flow conditioner under test", by B. Mickan, G. Pereira, J. Wu and D. Dopheide.

Developing these ideas, DE 10 2011 079 933 A1 discloses a flow conditioner with holes on concentric circular paths, which get larger toward the center.

SUMMARY

Starting from the preceding state of the art, an object of the present invention is to achieve a yet better optimizing of flow by a new shaping of a flow conditioner.

A flow conditioner of the invention comprises a perforated plate with a central hole and four or more circular paths, which are arranged radially from the central hole and concentrically with one another, and wherein holes are arranged on these concentric circular paths. A preponderate number of holes of an intermediate circular path have a greater hole diameter than a preponderate number of holes of the innermost and a preponderate number of holes of the outermost circular paths.

For a long time, it has been standard practice that the hole diameters in most flow conditioner plates in going from the outside to the inside become continuously smaller or larger. Large hole diameters on one or more intermediate circular paths gives a fast mixing to the final mass flow distribution in the middle of the flow profile.

Advantageous embodiments are subject matter of the dependent claims.

The holes are preferably embodied cylindrically in the perforated plate. Cone shaped holes are also known. These have proved, however, to be less favorable.

The holes of the circular paths should preferably not differ too strongly from one another. Flow conditioner as claimed in claim 1 or 2, characterized in that, starting from the central hole (1), the innermost circular path (2) is arranged with a plurality of holes (8), wherein the ratio $r_8/D_i$, thus the ratio of the radius of a hole (8) of this innermost circular path (2) to $D_i$, the diameter of the perforated plate (6),
is 2-10% greater than
the ratio $r_1/D_i$, thus the ratio of the radius of the central hole (1) to $D_i$, the diameter of the perforated plate (6).

Additionally or alternatively, it is advantageous that, starting from the central hole (1), the innermost circular path (2) is arranged with a plurality of holes (8), wherein the ratio $r_9/D_i$, thus the ratio of the radius of a hole (9) of a second circular path (3) following this innermost circular path (2) to $D_i$, the diameter of the perforated plate (6),
is 2-10% greater than
the ratio $r_{10}/D_i$, thus the ratio of the radius of a hole (10) of a third circular path following the second circular path (3) in the radial direction to $D_i$, the diameter of the perforated plate (6).

Additionally or alternatively, it is advantageous that the ratio $r_9/D_i$, thus the ratio of the radius of a hole (9 and/or 10) of an intermediate circular path (3 or 4) to $D_i$, the diameter of the perforated plate (6),
be 30-60% greater than
the ratio $r_{11}/D_i$, thus the ratio of the radius of the hole (11) of the outermost circular path (11) to $D_i$, the diameter of the perforated plate (6).

For a faster flow profile development, it has additionally proved favorable that the holes of the radially outermost circular path have the smallest hole diameter.

The holes are advantageously arranged on the circular paths in such a manner that the perforated plate, in the case of rotation around the longitudinal axis, i.e. around the center, by an angle between 30-60°, can be brought to coincide with its position before the rotation. This symmetry has likewise an advantageous effect on the forming of the flow profile.

The thickness of the perforated plate amounts advantageously to between 10 to 15% of the length of the diameter of the perforated plate.

For a symmetric alignment of the flow, it is advantageous that 8 holes be arranged on the radially innermost circular path.

It has proved to be favorable that on each circular path only holes with unified hole diameters are arranged.

The holes of the perforated plate can ideally have a circularly shaped periphery.

Apart from the central hole, the holes of each circular path can have another hole diameter than the holes of the other circular paths.

BRIEF DESCRIPTION OF THE DRAWINGS

The subject matter of the invention will now be explained in greater detail based on the appended drawing, the sole FIGURE of which shows as follows:

FIG. 1 shows flow conditioner in an embodiment of the invention.

DETAILED DESCRIPTION

An object of the invention is to provide an improved flow conditioner.

Perforated plates are known per se. They should ideally enable the forming of a fully developed and axially symmetric flow profile. For this, usually very long inlet lengths are required. In spite of this, pumps, protrusions or cavities on the inner wall of a tube or pipe or pipe junctions can lead to flow turbulence.

The present perforated plate of the invention represents an optimum compared with the previous perforated plates from the state of the art relative to forming a fully developed flow profile and relative to forming an axially symmetric flow profile.

In such case, the flow is already at the beginning very near to the developed profile and forms, thereafter, because of the targeted distribution of turbulent disturbances, the desired profile as rapidly as possible.

Micro turbulences can, in spite of this, occur in the case of the perforated plate of the invention. The amount of micro turbulences can, however, when required, be lessened or prevented by other measures.

The perforated plate 6 of the invention has holes, which are arranged on concentric circular paths 2, 3, 4 and 5 around a central hole 1, which is located in the middle of the perforated plate.

Preferably, the circular paths 2-5 have exclusively holes with unified hole diameter. Preferably, no holes are present outside of the concentric circular paths.

The holes of the circular paths are preferably round. They have, likewise preferably, hole centers Z, wherein, in each case, the hole centers Z of two of the holes of a circular path are arranged on a line G, which is perpendicular to the surface normal of the perforated plate 6.

The perforated plate 6 has a cylindrical basic form with a, preferably circularly round, cylinder base 7 and a longitudinal axis, and, coaxially therewith, a lateral surface.

Preferably, the flow conditioner is used in a flow measuring device. The perforated plate shown in FIG. 1 has a total of 89 holes.

Arranged in the center of the perforated plate 6 is the central hole 1. This hole 1 can have a ratio $r_1/D_i$, of preferably less than 0.04; especially preferably 0.038 to 0.04; especially 0.039. In such case, $r_1$ is the radius of the hole 1 and $D_i$ the diameter of the perforated plate 6.

Starting from the central hole 1 in the radial direction out to the length $L_1$, a first circular path 2 is arranged, on which a total of 8 holes 8 are arranged symmetrically around the central hole 1.

The holes 8 on the first circular path 2 can have a ratio $r_8/D_i$ of preferably greater than 0.04; especially preferably from 0.041 to 0.043; especially 0.042. In such case, $r_8$ is the radius of a hole 8 and $D_i$ the diameter of the perforated plate 6.

The holes 8 have, based on their midpoints Z, a separation $L_8$ from the longitudinal axis of the perforated plate 6. The ratio of this separation $L_8$ to the diameter $D_i$ of the perforated plate 6, thus $L_8/D_i$, amounts preferably to between 0.12 and 0.13, especially preferably between 0.123 and 0.125, especially 0.124. Especially preferably, the holes 8 of the first circular path 2 can be embodied 5-8%, especially 6.8-7.5%, larger than the central hole, based on the diameter of the hole 1.

Starting from the first circular path 2, there is arranged in the radial direction a second circular path 3, on which are arranged symmetrically around the central hole 1 a total of 16 holes 9. Holes 9 on the second circular path 3 can have a ratio $r_9/D_i$ of preferably greater than 0.041; especially preferably 0.042 to 0.044; especially 0.043. In such case, $r_9$ is the radius of a hole 9 on the second circular path 3 and $D_i$ the diameter of the perforated plate 6. Especially, the holes 9 of the second circular path 3 can be embodied larger than the holes 8 of the first circular path 2.

Holes 9 have, based on their midpoints Z, a separation $L_9$ from the longitudinal axis of the perforated plate 6. The ratio of this separation $L_9$ to the diameter $D_i$ of the perforated plate 6, thus $L_9/D_i$, amounts preferably to between 0.23 and 0.26, especially preferably between 0.246 and 0.252, especially 0.249. Especially preferably, the holes 9 of the second circular path 3 can be embodied 8-11%, especially 9.0-9.6%, larger than the central hole 1, based on the diameter of the hole 1.

Starting from the second circular path 3, there is arranged in the radial direction a third circular path 4, in which a total of 24 holes 10 are arranged symmetrically around the central hole 1. The holes 10 on the third circular path 4 can have a ratio $r_{10}/D_i$ of preferably less than 0.041; especially preferably 0.040 to 0.038; especially 0.039. In such case, $r_{10}$ is the radius of a hole 10 on the third circular path 4 and $D_i$ the diameter of the perforated plate 6. Especially, the holes 10 of the third circular path 4 can be embodied smaller than the holes 9 of the second circular path 3 and especially preferably also smaller than the holes 8 of the first circular path 2.

Holes 10 have, based on their midpoints Z, a separation $L_{10}$ from the longitudinal axis of the perforated plate 6. The ratio of this separation $L_{10}$ to the diameter $D_i$ of the perforated plate 6, thus $L_{10}/D_i$, amounts preferably to between 0.34 and 0.37, especially preferably between 0.356 and 0.362, especially 0.359. Especially preferably, the holes 10 of the third circular path 4 can deviate by less than 2% from the diameter of the central hole 1.

Starting from the third circular path 4, there is arranged in the radial direction a fourth circular path 5, in which a total of 40 holes 11 are arranged symmetrically around the central hole 1. The holes 11 on the fourth circular path 5 can have a ratio $r_{11}/D_i$ of preferably less than 0.030; especially preferably 0.026 to 0.028; especially 0.027. In such case, $r_{11}$ is the radius of a hole 11 on the fourth circular path 5 and $D_i$ the diameter of the perforated plate 6. Especially, the holes 11 of the fourth circular path 5 can be embodied smaller than the holes 8, 9, 10 of the other circular paths 2, 3, 4 and the central hole 1.

Holes 11 have, based on their midpoints Z, a separation $L_{11}$ from the longitudinal axis of the perforated plate 6. The ratio of this separation $L_{11}$ to the diameter $D_i$ of the perforated plate 6, thus $L_{11}/D_i$, amounts preferably to between 0.42 and 0.47, especially preferably between 0.445 and 0.449, especially 0.447. Especially preferably, the holes 11 of the fourth circular path 5 can be embodied 40-48%, especially 43-45%, larger than the central hole 1, based on the diameter of the hole 1.

Quite especially preferably, the holes in the perforated plate are arranged in such a manner that the perforated plate in the case of rotation by an angle around the longitudinal axis can be brought to coincide with its position before the rotation. This angle lies preferably in a range between 30-60°, especially at 45°.

The thickness of the plate amounts preferably to between 10 to 15% of the length of the diameter of the perforated plate, especially preferably between $0.11$-$0.13$ $D_i$, especially $0.12$ $D_i$.

The pressure drop coefficient $\zeta$ for a completely turbulent region lies between 1.5 and 3, especially between 2.0 and 2.5, in the case of the embodiment of the flow conditioner of the invention, wherein:

$$\zeta = \frac{2\Delta p}{\rho c^2}$$

The perforated plate has an approximately circular strike surface, in plan view and in section.

In a further development of the invention, the above mentioned measures are especially so selected that a ratio of passage area through the strike surface, formed by the holes, to the strike surface area is between 0.4 and 0.5, preferably between 0.43 and 0.47.

A flow conditioner of the invention is placed in a pipeline e.g. upstream before a flow measuring device, especially a flow measuring device of industrial process measurements technology, for example, a thermal mass flow meter. This application is, for example, beneficial for lessening a so-called inlet length before the flow measuring device, e.g. after a curvature of the pipeline, thus downstream from a curvature of the pipeline. The length of the distance parallel to the principal flow direction of the fluid in the pipeline, most often, along the pipeline longitudinal axis, between the flow conditioner and the flow measuring device, amounts then, for example, to less than 3·D. The equally measured length of the distance between the end of the tube curvature and the flow conditioner amounts, for example, to less than 5·D. Especially, flow conditioners of the invention are suitable in the case of flows in the laminar, transitional and turbulent regions, especially for gases.

LIST OF REFERENCE CHARACTERS 1 central hole
2-5 circular paths
6 perforated plate
8-11 holes

The invention claimed is:

1. A flow conditioner comprising a perforated plate with a cylindrical central hole and four or more circular paths that are arranged radially from the central hole and concentrically with one another, wherein cylindrical holes are arranged on the concentric circular paths, wherein a preponderant number of holes on an intermediate circular path have a greater hole diameter than a preponderant number of holes on a radially innermost circular path and a preponderant number of holes on a radially outermost circular path, wherein a radius of a hole on the innermost circular path is 2% to 10% greater than a radius of the central hole, wherein a radius of a hole on a second circular path following the innermost circular path is 2% to 10% greater than the radius of a hole on the innermost circular path, wherein the radius of a hole on the second circular path is 2% to 10% greater than a radius of a hole on a third circular path following the second circular path.

2. The flow conditioner as claimed in claim 1, wherein the radius of a hole on the intermediate circular path is 30% to 60% greater than a radius of a hole on the outermost circular path.

3. The flow conditioner as claimed in claim 1, wherein the holes on the outermost circular path have the smallest hole diameter.

4. The flow conditioner as claimed in claim 1, wherein the holes are arranged on the circular paths such that the perforated plate, in the case of rotation around a longitudinal axis by an angle between 30° to 60°, can be brought to coincide with its position before the rotation.

5. The flow conditioner as claimed in claim 1, wherein the thickness of the perforated plate is 10% to 15% of a diameter of the perforated plate.

6. The flow conditioner as claimed in claim 1, wherein eight holes are arranged on the innermost circular path.

7. The flow conditioner as claimed in claim 1, wherein on each circular path only holes with uniform hole diameters are arranged.

8. The flow conditioner as claimed in claim 7, wherein the holes on each circular path have a hole diameter different from the holes on the other circular paths.

9. The flow conditioner as claimed in claim 1, wherein the holes on the perforated plate have a circularly shaped periphery.

10. A flow measuring device, comprising:
a flow conditioner including a perforated plate with a central hole and four or more circular paths that are arranged radially from the central hole and concentrically with one another, wherein holes are arranged on the concentric circular paths, wherein a preponderant number of holes on an intermediate circular path have a greater hole diameter than a preponderant number of holes on a radially innermost circular path and a preponderant number of holes on a radially outermost circular path, wherein a radius of a hole on the innermost circular path is 2% to 10% greater than a radius of the central hole, wherein a radius of a hole on a second circular path following the innermost circular path is 2% to 10% greater than the radius of a hole in the innermost circular path, wherein the radius of a hole on the second circular path is 2% to 10% greater than a radius of a hole of a third circular path following the second circular path.

11. A flow conditioner, comprising:
a circular plate having a plurality of cylindrical holes,
wherein one of the plurality of holes is a central hole disposed in the center of the plate,
wherein the remaining holes are disposed in at least four groups:
a first group disposed uniformly along a first circular path concentric with the central hole, the holes of the first group having a uniform size such that a radius of a hole in the first group is 2% to 10% greater than a radius of the central hole,
a second group disposed uniformly along a second circular path concentric with the central hole, the second circular path having a diameter greater than a diameter of the first circular path, the holes of the second group having a uniform size such that a radius of a hole in the second group is 2% to 10% greater than the radius of a hole in the first group,
a third group disposed uniformly along a third circular path concentric with the central hole, the third circular path having a diameter greater than the diameter of the second circular path, the holes of the third group having a uniform size such that the radius of a second group hole is 2% to 10% greater than a radius of a third group hole, and
at least a fourth group disposed uniformly along a fourth circular path concentric with the central hole, the fourth circular path having a diameter greater than the diameter of the third circular path, the holes of the fourth group having a uniform size such that the radius of a second group hole is 30% to 60% greater than a radius of a fourth group hole.

12. The flow conditioner of claim 11, wherein the plurality holes is disposed on the plate in a pattern that repeats every 30 to 60 arc degrees of the plate.

13. The flow conditioner of claim 11, wherein a ratio of a plate thickness to the plate diameter is between 10% and 15%.

* * * * *